United States Patent [19]

Lemelson

[11] 4,285,903
[45] Aug. 25, 1981

[54] MOLDING SYSTEM

[76] Inventor: Jerome H. Lemelson, 85 Rector St., Metuchen, N.J. 08840

[21] Appl. No.: 109,188

[22] Filed: Jan. 3, 1980

Related U.S. Application Data

[63] Continuation-in-part of Ser. No. 828,747, Aug. 29, 1977, abandoned, which is a continuation of Ser. No. 645,628, Dec. 31, 1975, abandoned, which is a continuation-in-part of Ser. No. 547,621, Feb. 6, 1975, Pat. No. 4,043,721, which is a continuation of Ser. No. 300,248, Jan. 24, 1972, Pat. No. 3,875,275, which is a continuation of Ser. No. 744,048, Jul. 11, 1968, abandoned.

[51] Int. Cl.³ .............................................. B29C 5/04
[52] U.S. Cl. ................................. 264/310; 264/40.1; 264/45.7; 264/255; 425/435
[58] Field of Search ..................... 264/45.7, 310, 311, 264/312, 40.1, 255; 425/435

[56] References Cited

U.S. PATENT DOCUMENTS

| | | | |
|---|---|---|---|
| 3,396,773 | 8/1968 | Alderfer | 264/45.7 X |
| 3,763,293 | 10/1973 | Nussbaum | 264/327 X |
| 3,875,275 | 4/1975 | Lemelson | 264/45.7 |
| 4,043,721 | 8/1977 | Lemelson | 425/435 X |
| 4,190,411 | 2/1980 | Fujimoto | 264/311 X |

FOREIGN PATENT DOCUMENTS 136862 12/1919 United Kingdom ..................... 425/435

Primary Examiner—Thomas P. Pavelko

[57] ABSTRACT

A molding system and method are provided together with articles produced thereby wherein rapidly setting molding material is introduced into a mold and made to conform to the walls of the mold cavity by movement of the mold prior to the setting of the molding material. Precise automatic control is effected, not only of one or more resinous molding materials but also of catalyst's employed to rapidly set the molding material and also of a plurality of power operated devices which serve to move the mold about a plurality of axes. Automatic control is also effected of power operated means for varying the operation of one or more mixing chambers, valves and the like in a preprogrammed molding cycle. In a particular form, feedback control is employed to assure the predetermined operation of the motors and power operated devices controlling the complete molding operation. Of the structures produced by means of the system defining the invention, composite articles such as plastic pallets and other devices containing similar plastic core portions are provided.

14 Claims, 6 Drawing Figures

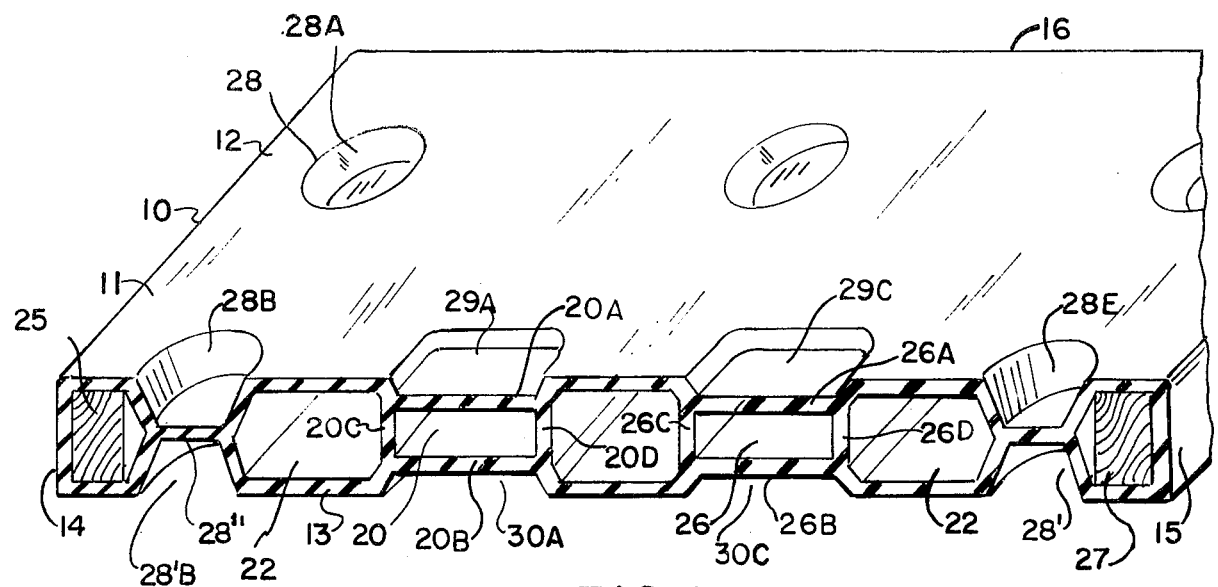
FIG.1
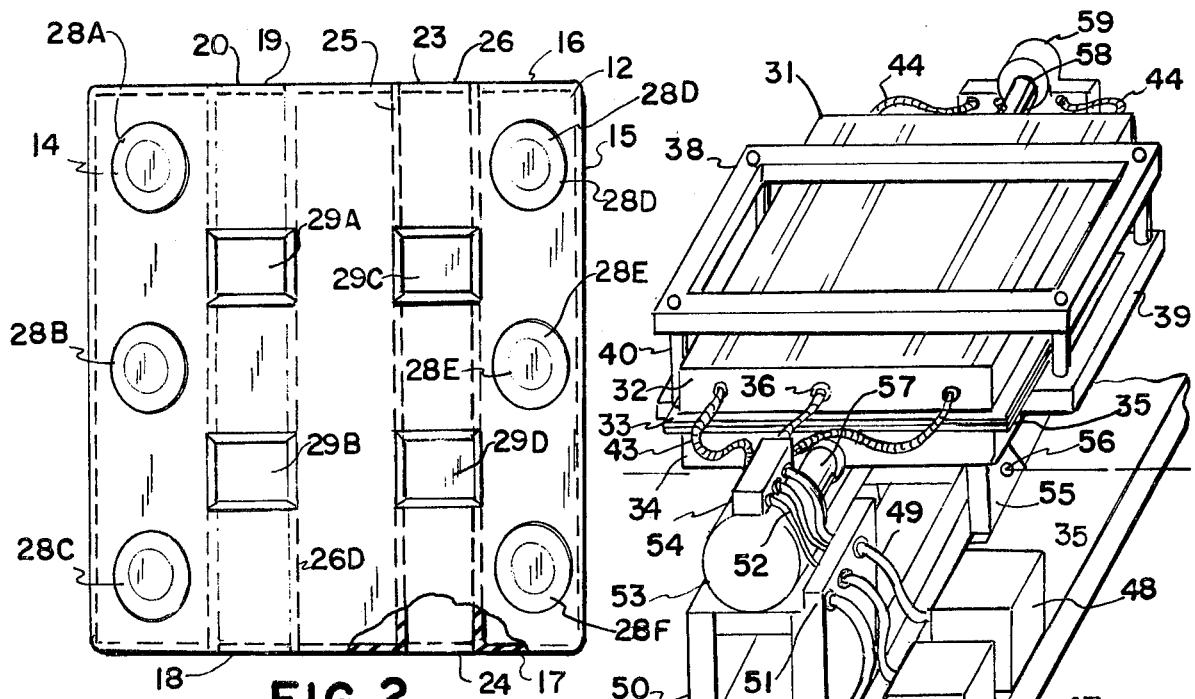
FIG.2
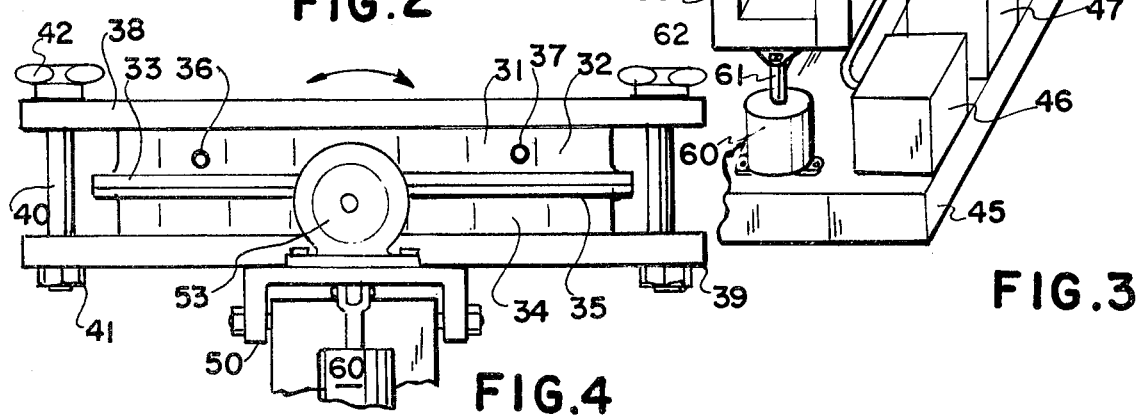
FIG.3
FIG.4

4,285,903

MOLDING SYSTEM

RELATED APPLICATIONS

This is a continuation-in-part of application Ser. No. 828,747 filed Aug. 29, 1977 now abandoned for Molding System, Method and Article as a continuation of Ser. No. 645,628 filed Dec. 31, 1975 now abandoned, as a continuation-in-part of application Ser. No. 547,621 filed Feb. 6, 1975 now U.S. Pat. No. 4,043,721 which was a continuation of Ser. No. 300,248 filed Jan. 24, 1972, now U.S. Pat. No. 3,875,275, a continuation of Ser. No. 744,048 filed July 11, 1968 now abandoned.

SUMMARY OF THE INVENTION

This invention relates to improvements in apparatus and methods for producing large hollow plastic articles, such as plastic pallets and the improved structures defining such articles.

It is known in the art to form large hollow bodies of plastic by so called rotational molding wherein a predetermined charge of either a thermosetting resin in liquid form or a powdered thermoplastic resin is admitted to a mold which is thereafter rotated to distribute molding material about the surface of the mold which solidifies thereon to form a hollow body. In the case of the thermosetting resin, the plastic is set and solidified by heat transferred thereto through the wall of the mold as it is rotated. In the case of a thermoplastic powder, said material is rendered molten as a shell against the wall of the mold by heat transferred through the mold wall to the powder which it melts.

The instant invention is directed to an apparatus and method for forming large hollow bodies of so called instant set polymers commonly known as ISP resins of the type manufactured by the Dow Chemical Company of Midland, Michigan which molding materials are mixed from a resin, a catalyst and a modifier the latter serving to generate an exothermic reaction with either or both the catalyst and the resin during the mixing process which provides heat for setting the polymer. During the setting process, the modifier becomes encapsulated within tiny cells (less than half a micron in diameter) formed in the plastic mixture, thus increasing the strength of the resulting molded plastic.

While such quick setting resinous materials have been employed in forming articles by casting or injection molding at low pressure to fill a mold cavity, they have not been applied in the production of large hollow objects such as formed by rotating a mold due to the inherent quick setting characteristics of the resin and its inability to reach all portions of the mold by the time the resin sets.

The instant invention employs mold structures and a molding technique wherein a fast setting resinous material is discharged into a mold while the mold is rotating and, in certain instances, varied in horizontal attitude, in such a manner as to provide molding material throughout the mold and against predetermined portions of the mold cavity wall in predetermined quantities so as to predetermine the thickness of the wall of the molded article. In one form, the fast setting resin is mixed with its catalyst and modifier just as it enters the mold or immediately before being injected into the mold so that it will not clog the supply lines therefore. The quick setting molding material may be simultaneously introduced through a plurality of openings in a single tubular conduit or through a plurality of inlets to the mold which may comprise orifices or a plurality of conduits extending partially into or completely through the mold so as to effect distribution of the molding material to different portions of the mold cavity and result in the formation of a molding, shortly after introduction of the fast setting plastic, having predetermined wall thicknesses and configurations. The entire operation which includes controlling the flow of molding material components, the resulting mixtures thereof, the rotation or multi-axis movement of the mold as well as other molding variables, may be effected by means of a programming device such as a multi-circuit timer, an electronic memory generating control signals in sequence or a digital computer which is programmed to control operation of the molding apparatus in an open or closed loop control cycle by generating command control signals and utilizing same per se or as an input to a closed loop control system.

Accordingly, it is a primary object of this invention to provide a new and improved molding apparatus and method for molding large hollow objects.

Another object is to provide a molding apparatus and method for forming large objects of fast setting resins by introducing the molding material to a mold at a plurality of locations so as to adequately and predeterminately distribute the molding material in the mold before it has set or has begun to set to shape.

Another object is to provide improvements in systems for controlling rotational molding of one or more molding components.

Another object is to provide improved structures in articles formed by rotational molding.

In the drawings:

FIG. 1 is an isometric view of a plastic pallet sectioned across its width;

FIG. 2 is a plan view of a modified form of the pallet illustrated in FIG. 1;

FIG. 3 is an isometric view of a molding apparatus including a mold capable of producing a large hollow plastic article such as the pallet illustrated in FIGS. 1 and 2;

FIG. 4 is an end view of a portion of the apparatus illustrated in FIG. 3,

Figure 5:
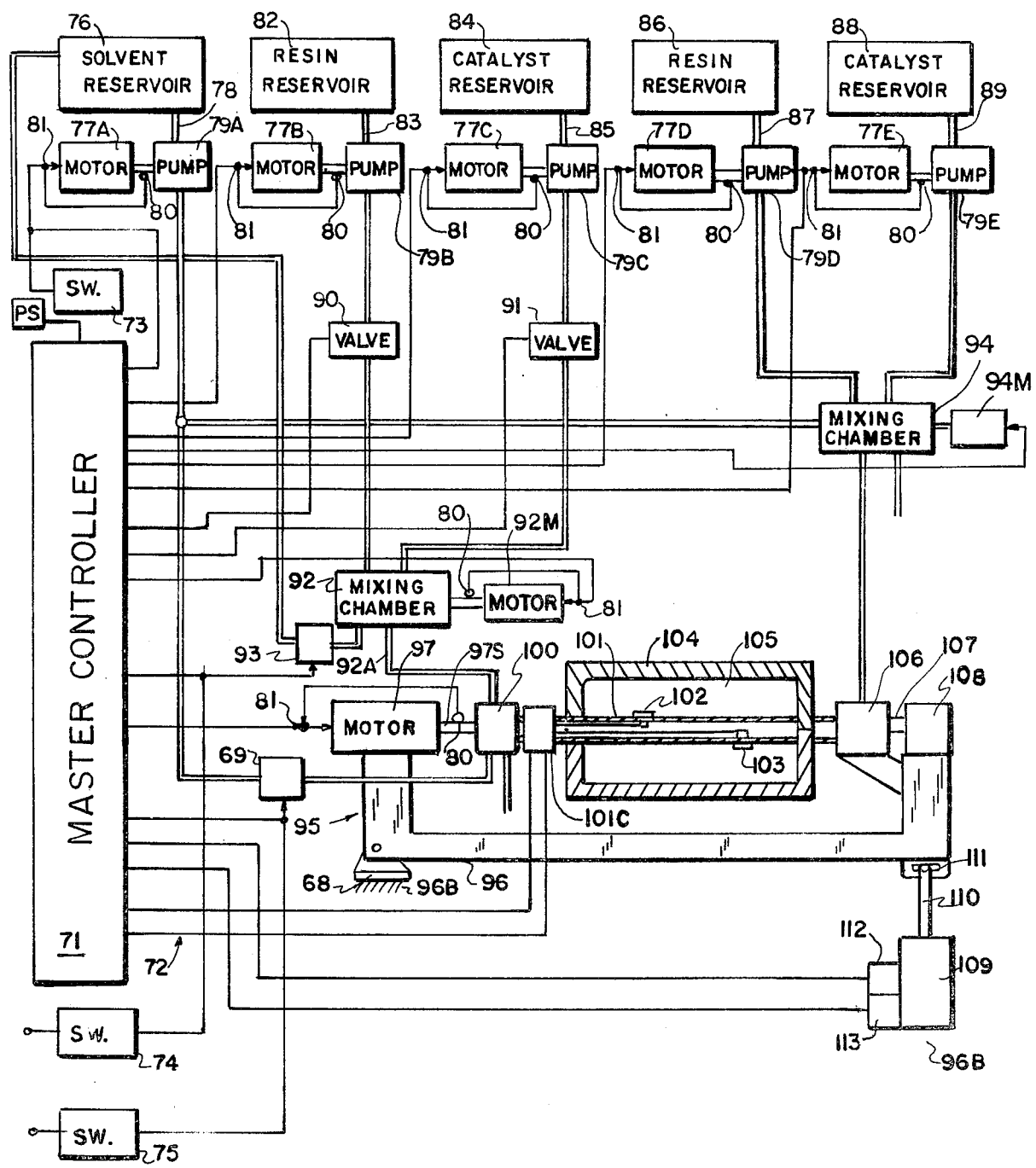
FIG. 5 is a schematic diagram of a control system for controlling the operation of molding apparatus of the types shown in FIGS. 3 and 4.

In FIGS. 1 and 2 is shown a hollow plastic molding 10 in the form of a slab-like support or pallet for holding an article or a series of articles on the upper surface thereof. The molding 10 is defined by a hollow shell 11 comprising a top wall 12, bottom wall 13, side edge walls 14 and 15 and end walls 16 and 17, the end wall 17 being illustrated in FIG. 2. The interior volume 22 of molding 10 is sealed except for a pair of parallel passageways 20 and 26 which extend completely through the pallet and are defined by respective parallel wall portions forming part of the molding.

The molded shell 11 contains substantially flat top and bottom walls 12 and 13 each of which have a plurality of indentations molded therein. A first group of indentations 28 is illustrated in FIG. 2 as six indentations in the top wall and denoted 28A–28F. Each of the indentations 28 in the top wall 12 are aligned with respective similarly shaped indentations having the general notation 28' and defined by alphabetical subscripts similar to those of 28. The latter indentations are formed in the opposite wall 13 and provide a common wall portion 28" between each two indentations. These pairs of indentations serve to stiffen the hollow molded structure and to support the major walls 12 and 13 of the pallet. While nine indentations are illustrated in each wall 12 and 13 in the embodiment of FIG. 2, additional pairs of indentations may be provided as shown in FIG. 1 to provide additional stiffening means for the pallet and support for the opposite major walls thereof.

As noted, the molding 10 contains two passageways 20 and 26 which are each open at their ends and extend completely through the pallet parallel to each other from one end to the other, each of which passageways is spaced a distance apart from the other and is shaped to receive and support a respective blade of a forklift such as the forks of a lift truck or crane utilized to support and lift pallets off the ground. The passageway 20 is defined by parallel side walls 20C and 20D which extend between the top wall 12 and the bottom wall 13 and parallel top and bottom walls 20A and 20B which respectively extend to said side walls and a distance beneath the top and bottom walls 12 and 13, thus forming a box-beam-light structure extending completely through the interior volume 22 of the pallet between the end walls 16 and 17 thereof. The molded-in passageway 26 is defined by respective side wall portions 26C and 26D extending between and joined to the top and bottom walls 12 and 13. Top and bottom wall portions 26A and 26B of the passageway 26 join the side wall portions 26C and 26D and extend completely through the pallet preferably spaced similar distances from the top and bottom walls 12 and 13.

Passageway 20 is accessible from either end of the pallet by respective openings 18 and 19 in the walls 16 and 17 while passageway 26 is accessible from the ends of the pallet through openings 23 and 24 in the end walls 16 and 17 thereof.

All of the wall formations described above and illustrated in FIGS. 1 and 2 are integrally joined together as part of a single hollow shell-like molding 11 which is preferably formed by rotationally molding or casting a thermoplastic or thermosetting resin in the cavity of a mold containing at least two removable inserts extending between the opposite walls of the mold cavity to define the passageways 20 and 26. Such inserts may comprise respective box-beams or solid rods the ends of which abut respective end wall portion of opposite walls of the mold cavity and are pinned thereto by fastening means which are removed in order to permit the molding to be removed from the mold after which the box-beams are slidably removed from the passageways 20 and 26 which are formed thereby through the center of the molding. The box-beams may also be retained by respective opposite set cavities in both mold halves permitting the molding with the beams therein to be removed from the mold when the mold halves are separated from each other, after which each of the box-beams is slidably removed from the passageways. Each of the mold inserts which define passageways 20 and 26 may also be formed of a pair of insert members which are respectively removed from opposite ends of the molding to facilitate the removal thereof.

Also illustrated in FIG. 1 are respective reinforcing members denoted 25 and 27 which may comprise solid wooden beams, metal box beams, channels which respectively extend adjacent to the side walls 14 and 15 and the border portions of the top and bottom walls 12 and 13 which are adjacent said side walls. The beams 25 and 27 serve to stiffen the pallet and may be joined by beams or rods extending laterally across the molding, preferably between the spaces provided between the walls 12 and 13 and the walls 20A, 26A and 20B, 26B of the passageways which serve to laterally stiffen the pallet. Beams 25 and 27 may be held in place within the mold cavity prior to the injection of the molding material which forms the shell 11 by means of steel pins which are respectively supported in holes in the mold cavity wall and are slidably removable in the longitudinal direction thereof to permit removal of the pallet 10 from the mold cavity after molding is completed.

In another form of the invention, it is noted that the volume 22 defined by the hollow shell molding 11 may be filled with a supporting material such as an expanded, cellular plastic resin such as polyurethane resin which is introduced into the volume 22 in an unexpanded condition while the molding 11 is either disposed within the mold or is solidified after it is removed from the mold, to such an extent that the walls thereof will not be deformed by the force of the expanding resin injected into the interior volume of the molding. Reference is made to my copending application Ser. No. 547,621 entitled Composite Body Molding Apparatus And Method for details of an apparatus and method for forming a composite molding by rotationally casting a non-cellular plastic into a hollow body in a mold and injecting a self expanding plastic into a cellular core portion of the molding while the hollow body is retained in the mold and prevented from outwardly deforming by the force of the expanding plastic ejected therein. By retaining the hollow body within the mold while the core plastic is expanded therein, the hollow body need not be completely set or hardened during the formation of the cellular core portion.

In yet another embodiment of the pallet structure illustrated in FIGS. 1 and 2, it is noted that one or more portions of the shell molding may contain interior wall portions separating the volumes surrounded thereby from the remaining inside volume of the hollow molding. For example, the volumes in which the stiffening beams 25 and 27 are retained in the embodiment illustrated in FIG. 1, may be completely separated from the remaining interior volume of the molding by a wall portion similar, for example, to wall portion 20C, which extends between the upper wall 12 and the lower wall 13 and is formed by an insert which is removed from one end of the molding prior to completing the molding operation. A self expanding rigid plastic may be injected into said one or more interior volumes and allowed to expand into a cellular mass which completely fills the volume or volumes into which the plastic is injected to serve as stiffening means for the wall portions of said volume or volumes, possibly as a substitute for the stiffening members 25 and 27 or to otherwise predeterminately provide support for portions of the molding. As an example, if the molding of FIGS. 1 and 2 does not require the use of the passageways 20 and 26 for receiving the forks of a forklift, a rigid, self expanding plastic resin such as a so-called instant-set-polymer (ISP) of the type manufactured by the Dow Chemical Company of Midland, Michigan may be injected into said volume while either or both ends thereof are closed off and may be expanded into respective cellular plastic masses which serve to stiffen and support the entire molding when they solidify. Such stiffening means may be utilized per se or in combination with one or more preformed rigid inserts secured within the interior of the hollow molding by being provided across the mold cavity prior to the molding operation.

In FIG. 3 is shown an apparatus for rotationally molding a large hollow object of the type illustrated in FIGS. 1 and 2. A multiple part mold 31 is composed of an upper mold section 32 having a rim portion 33 which is assembled with the rim portion 35 of a lower mold section 34, there preferably being a sealing washer or other form of mechanical seal disposed between the two rim portions to effect a fluid pressure seal between the two mold halves to prevent the escape of molding material therefrom during the molding procedure. A clamping frame composed of upper and lower rectangular frame members 38 and 39 which are joined together by elongated bolts 40, secures the mold sections 32 and 34 together while respective aligned shafts 57 and 58 are secured either to the mold frame or mold section 34 permitting rotation of the mold assembly about the axis of said shafts. Shaft 57 is the output shaft or an extension of the drive shaft of a constant speed gear motor 53 which is supported on a frame 50 which extends to support a pillow block 59 supporting shaft 58 at the far end of the mold assembly. Frame 50 is varied in its horizontal attitude by the operation of a lineal actuator 60 having a shaft 61 which is pinned to a fitting 62 extending from the bottom of frame 50 near one end thereof. Projection or retraction of the shaft 61 of the hydraulic or pneumatic actuator 60 tilts the frame 50 on a shaft 56 which is supported by a plurality of pillow blocks, one of which 55 is shown secured to the main support or base 45 for the molding apparatus.

A plurality of reservoirs or containers denoted 46–48, each contain a supply of plastic resin, catalyst and modifier, are also supported by the main frame or base 46. Output lines 49 of the materials in each of the reservoirs 46–48 extend to the frame 50 and then through lines 52 to a chamber 54 supported above motor 53, in which chamber the components are mixed and are fed therefrom as a mixture of instant set polymer molding material through a plurality of lines 43 and 44 which extend to different locations of the mold cavity. The mixed material may be injected through the different orifices or tubes extending through the mold cavity at constant pressure wherein later flow from each inlet is delivered at constant pressure or wherein the rate of flow through each inlet line is controlled by the automatic control of a respective valve connected to each line or a respective pump connected to each line so that predetermined distribution of mixed molding material may be effected by the automatic control of each of the valves and/or pumps employed. The pumps or valves may be automatically timed in their operation to inject their respective mixtures of molding material at predetermined times during a molding cycle so as to predeterminately control the molding process, the distribution of molding material in the mold, the relative solidifications of the different quantities of molding material injected and, accordingly, the thickness and characteristics of the different portions of the molding itself. Such variable injection of different quantities of molding material may be effected while the mold is rotating or otherwise moved, from a batch mixture of molding material effected in chamber 54 or from respective supply lines of molding material, each of which is connected to the respective supplies of molding material components which are mixed when the valve is opened or the respective pump is operated to deliver a fresh supply of molding mixture the respective location of the mold associated with the particular inlet line.

Assuming that the molding material employed in the molding process described is a so called instant set polymer such as Voranol or Varanate manufactured by the Dow Chemical Company and sets within less than a minute after being mixed, then it will be necessary to carefully control the flow of the components of such a resin to either the mold or a mixing chamber, the mixing operation itself and the flow of mixed components from the mixing chamber to the mold as well as the movement of the mixed resin in the mold cavity to properly distribute same about the mold cavity and to form a hollow shell therein having a wall or walls of predetermined configuration and thickness. One or more of such process variables as moving the mold, moving one or more flow means such as nozzles which are movably supported in the mold or predeterminately flowing the molding material through a plurality of inlets to the mold, as described, may be employed to form the hollow article in the mold. Such control functions as well as additional functions associated with molding may be effected under the control of a master controller such as a multi-circuit self-recycling timer adapted to generate or gate control signals employing open loop control or a digital computer generating command control signals for the open or closed loop control of various motors wherein adaptive control means may also be employed to sense the condition of the plastic resin such as its rate of flow, deposited thickness on different portions of the mold cavity wall, etc., and to generate signals defining said variables which are employed to effect the adaptive control of flow and/or mold movement.

In FIG. 5 is shown a control system, designated 70, for automatically controlling an apparatus of the type illustrated in FIGS. 3 and 4, with certain modifications thereto as will be described. The system 70 employs a master controller 71 having a plurality of output control circuits 72 extending to various motors which operate pumps for the liquid molding materials and for rotating and otherwise moving the closed mold to distribute molding material about the mold cavity and valves for further controlling the flow of molding material to one or more locations in the mold. The rotational mold 104 is shown having a cavity 105 across which cavity is disposed a tubular member 101 which may form part of the composite molding or may be removed therefrom after the completion of molding to form, for example, a tubular formation or conduit or one of a plurality of such conduits defining, for example, the passageways 20 and 26 extending completely through the pallet molding illustrated in FIGS. 1 and 2. In other words, the insert or inserts which extend across the mold cavity to form the walls of the conduit formations defining the fork receiving passageways of the pallet may be employed as flow means or supports for one or more injection lines receiving molding material and conducting same through one or more openings in the walls of said supports to the interior volume 105 of the mold. In a particular embodiment of the invention shown in FIG. 5, a plurality of remotely controlled solenoid valves 102 and 103 are shown secured to the tubular conduit 101 and respectively controlled by signals generated by the master controller 71 and transmitted to said valves through a rotary coupling means 101C connected to the tube 101 which is an extension of or secured to the shaft 97S of an electrically powered gear motor 97 which operates to rotate the mold 104 for the purpose described. The motor 97 and an extension of the tubular member 101 extending through the mold are supported on a U-shaped frame 96 forming part of the rotational molding apparatus 95. The shaft extension 107 is rotationally supported in a pillow block 108 which is supported by a portion of the frame 96. The frame 96 is pivotally supported beneath the portion thereof supporting motor 97 and is variably tilted with respect to the horizontal by means of a lineal actuator 109 supported by the floor or base 96B supporting the entire rotational molding apparatus 95. The floor or base 96B also supports a plurality of brackets 68 which pivotally supports the frame just beneath the motor 97. Rotary fluid couplings 100 and 106 respectively receive different molding materials and conduct same at different times during the molding procedure to the interior of the hollow shaft or tube 101 for injection into the cavity 105 of the mold to form different portions of the composite molding by one of the techniques described elsewhere herein.

Five tanks of liquid materials are illustrated in FIG. 5, a solvent containing tank 76, a liquid resin containing tank 82, a liquid catalyst containing tank 84, a second liquid resin containing tank 86, and a second catalyst containing tank 88. The solvent in tank 76 is delivered either automatically or by manual control of the operation of a pump 79 in the output line 78 of tank 76 to one or more devices such as valves, pumps or mixing chambers through which molding materials are flowed during the molding operation.

The tanks 82 and 84 may contain any suitable resin and catalyst combination which, when mixed, either in a conduit through which they are flowed to the mold cavity or in a mixing chamber, will solidify shortly thereafter, such as during less than a minute after mixing has been effected, and preferably after the mixture has been predeterminately flowed into the cavity of the rotational casting mold. For example, reservoir tank 82 may contain the resin component and modifier of a so called ISP (instant set polymer) molding material system such as materials defined by the trademarks Voranol and Voranate which are manufactured by the Dow Chemical Company of Midland, Michigan, and which, upon proper mixing, set into a rather hard high strength plastic material within about 42 seconds after they are mixed. The modifier which may be mixed either with the urethane resin which may comprise an isocyanate and a polyol or with the catalyst provided in tank 84, is phased out of solution and becomes encapsulated in spherical cells formed in the hardened polymer defining droplets of said modifier which are about 0.5 microns in diameter which serve to substantially enhance the strength of the molded part and to absorb sufficient of reaction to allow the production of relatively large parts of relatively large wall thicknesses within less than a minute. The resin-modifier and catalyst liquids are respectively pumped from outlets 83 and 85 of tanks 82 and 84 by means of pumps 79B and 79C which are operated by respective automatically controlled motors 77B and 77C to deliver predetermined quantities of said liquid molding material components to a mixing chamber 92 which also employs an automatically controlled gear motor 92M to operate same and force the mixture from the mixing chamber to an outlet 92A extending therefrom to rotary coupling means 100 for the hollow injection tube 101 which extends into and across the cavity 105 of mold 104. Conversely, the outlet 92A of the mixing chamber 92 may comprise one or a plurality of flexible outlet lines extending therefrom to different inlets through the mold cavity wall such as those illustrated in FIGS. 3 and 4. The flow of molding material through each line extending from the mixing chamber may be controlled by means of a plurality of solenoid operated valves connected either to the mixing chamber and the lines extending therefrom or to the mold itself, as illustrated, for example, in FIG. 5, wherein each valve is controlled by solenoid energizing signals generated on the outputs 72 of the master controller 71 at predetermined times in a molding cycle which signals are of such duration and so timed as to effect molding material flow control to produce a molded article of predetermined physical characteristics.

Respective outputs of the master controller 71 extend to operate solenoid valves 90 and 91 in the output lines of the pumps 79B and 79C for the fast setting resin and catalyst components of one of the resin systems which is first introduced into the cavity 105 of the rotational mold to form a hollow shell thereof defined by the shape of the mold cavity wall. After the formation of such shell molding, it may be removed from the mold as a finished article with or without the tube 101 remaining therein or said tube may be removed from the molding. The molding so formed may be further processed by the injection of a second molding material supplied from a mixing chamber 94 which respectively receives a liquid polymer and catalyst from supply tanks 86 and 88 as pumped thereto on outlet lines 87 and 89 by respective pumps 79D and 79E which are operated by the respective controlled gear motors 77D and 77E.

Each of the motors 77A, 77B, 77C, 77D, and 77E which operate the liquid pumps 79A-79E pump the respective liquids contained in the tanks 76, 82, 84, 86 and 88 to the mixing chambers 92 and 94, and is preferably automatically controlled in its timed operation and its speed of operation by means of a closed loop feedback control system of one of the types described in U.S. Pat. No. 3,412,431. The master controller 71 either gates respective sources of command control voltages defining respective reference command signals or generates same on respective inputs to comparator means such as summing amplifiers denoted 81A-81E for each of the motors 77A-77E against which reference command signals are bucked feedback signals generated by respective feedback tacometers, denoted 80, which are driven by the output shafts of the motors. The input to the control for each variable speed motor 77A-77E is thus a control signal which represents the difference between the reference command signal and the feedback signal which controls the operation of the motor in accordance with the characteristics of the reference command signal to operate same at a predetermined speed, thereby pumping the particular liquid molding material component through the pump operated by the respective motor to the particular mixing chamber or mold inlet. As a result, the signals generated on the output of the master controller 71 in predetermined timed sequence may cause the respective pairs of pumps 79B, 79C, and 79D, 79E to deliver precise quantities of the molding material components at predetermined times in a molding cycle to the mixing chambers 92 and 94 from which the mixed molding materials may automatically flow or may be pumped by similarly controlled motors such as motor 92M operating the mixing apparatus in chamber 92, to flow predetermined quantities of the molding materials into the cavity 105 of the mold, preferably while the mold is rotating at a predetermined speed and its axis of rotation is predeterminately angled with respect to the horizontal by the controlled operation of mold frame tilting motor or actuator 109. Controls 112 and 113 for the actuator 109 respectively cause the shaft 110 of the lineal actuator to be projected and retracted to thereby variably tilt the frame 96 on which the rotational mold 104 and its rotating motor are mounted.

The mixed resinous molding material formed of the resin and catalyst supplied from tanks 86 and 88 may comprise a self-expanding cellular plastic which may be injected into the hollow shell molding formed against the wall of the mold cavity 105 to completely or partially fill same and support the wall of the hollow molding so formed as a result of the controlled operation of the pump motors 77D and 77E by signals passed from the master controller to the control inputs or summing amplifiers of said pump motors at a time after the hollow shell formed of the molding mixture derived from chambers 82 and 84 has been set and formed against the wall of the mold cavity.

Closed loop control systems for the mold rotating motor 97 and the mold frame tilting motor 109 may also be provided although in FIG. 5 control of 109 is illustrated as effected by selectively energizing the forward and reverse drive controls 112 and 113 therefore with signals generated on outputs of controller 71.

Notations 69, 90, 91 and 93 refer to respective solenoid operated valves which are controlled by signals of predetermined time durations generated by the master controller 71 to open when it is desired to permit the flow of the respective materials passing through the valves thereof to their destinations. Notation 73 refers to a manually operated switch for controlling the operation of pump motor 77A to pump solvent from tank 76 to the mixing chamber 92 and the rotary coupling 100 and tube 101 for cleaning out same, when necessary. Notation 74 refers to a manually operated switch for manually controlling the operation of a solenoid valve 93 for permitting the recirculation of solvent material from the mixing chamber to the solvent tank 76 while notation 75 refers to a manually operated switch for controlling a solenoid valve 69 which may also be controlled by a signal generated by the master controller 71 to permit the flow of solvent through rotary coupling 100 and mold tube injector 101 for flushing and cleaning same when necessary.

As set forth above, the master controller 71 may comprise an adjustable multi-circuit self recycling timer operable to generate control signals of predetermined time durations for energizing the various motors and valve solenoids described for predetermined time durations to define a particular molding cycle of the type described or to generate control pulse signals on the outputs 72 which are applied to start and stop motors, open and close valves and to perform the functions described during predetermined times in a molding cycle. Where feedback loops are employed to control the operation of the described motors, predetermined command control signals against which shaft feedback signals may be bucked or summed to assure operation of the motors in accordance with the characteristics of such command control signals, may be generated from recordings thereof provided on respective tracks of a multiple track record member such as a magnetic tape or card driven by a constant speed motor as illustrated in FIG. 6.

Figure 6:
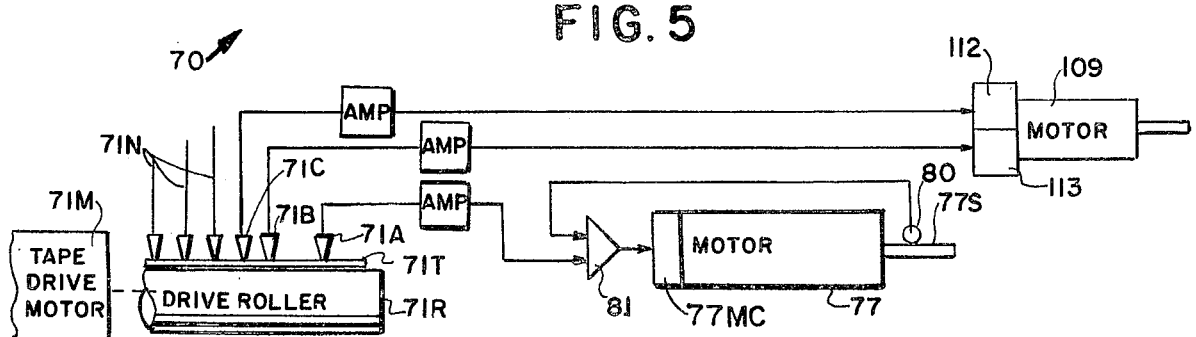
FIG. 6 is a schematic diagram showing two forms of motor control means applicable to the motors shown in FIG. 5.

In FIG. 6 an endless loop magnetic tape 71T is driven on a tape transport which includes a drive roller 71R cooperating with a second capstan roller or wheel (not shown) and power rotated against the tape by a constant speed gearmotor 71M. The tape 71T contains a plurality of record tracks each having recorded thereon command control signals in the form of analog or pulse signals which, when reproduced therefrom by respective magnetic pick-up heads 71A-71N and amplified by respective amplifiers denoted AMP may be applied to the control inputs of respective of the motors and solenoids described for predeterminately controlling each in a molding cycle to effect the desired mixing and injection into the mold or a plurality of molds of predetermined quantities of fast setting resin compositions and suitable cell forming filler resinous compositions and to predeterminately control the mold closing, tilting and rotating motors to effect predetermined resin(s) distribution in the mold for molding configurations of predetermined cross sectional configurations.

A first magnetic head 71A reproduces an analog command control signal from a first track of the tape 71T and said signal is applied to one input of a summing amplifier 81, which receives a feedback signal from shaft tachometer 80 and generates a difference which is applied to the controller 77MC for variable speed motor 77 thereby predeterminately controlling same as defined, for example, in my U.S. Pat. No. 3,412,431 and the parent patents mentioned therein. The motor 77 may be varied in its speed to vary the operation of the molding material pump driven thereby, in accordance with the characteristics of the command control analog signal reproduced from tape 71T by head 71A to variably feed said molding material to the mixing chamber or mold. The same control means may be utilized to control the speed of rotation of the mold by employing a similar feedback tachometer driven by the shaft of motor 97 as shown in FIG. 5 and reproducing a variable analog signal from a recording thereof on one of the channels of the tape 71T engaged by one of the magnetic pickup heads 71N. The motor tilting the mold may be similarly variably controlled so that mold rotation and attitude with respect to the horizontal will be predetermined and synchronized to the introduction of molding material into the mold cavity whereby the fast setting resin will become predeterminately distributed in the mold and will form a hollow molding, the wall portions of which are of predetermined thickness. Rate of flow of one or more molding materials may be predeterminately varied during a molding cycle in synchronization with variations in mold rotational speed and mold attitude by providing proper command control recordings on the respective tracks of the tape so as to predetermine the configuration of the shell molded of the one or more resinous compositions introduced into the mold either simultaneously or sequentially as described.

Motor 109, which may comprise a lineal actuator such as an air operated cylinder or hydraulic cylinder or an electric motor, with forward and reverse drive controls 112 and 113, is shown having the control inputs thereof receiving activating pulse signals reproduced by magnetic pickup heads 71B and 71C which scan respective tracks of the tape. Motor 109 may be a constant speed motoroperable to project its shaft when input 112 is activated and retract its shaft at a given speed when input 113 is activated and to stop movement of its shaft when neither input is energized by a signal from the reproduction signal amplifiers. Motor 109 may also comprise a stepping motor operable to project and retract its shaft when the controls 112 and 113 receive energizing pulses reproduced from respective channels or tracks of the tape 71T by heads 71C and 71B.

The control arrangement shown in FIG. 6 is only illustrative of two means for controlling the various motors employed in the apparatus described while other means may be employed for effecting automatic and predetermined control of the motors described. Signals reproduced from recordings on cards, discs, drums or solid state memories may also be utilized to effect similar modes of control of the molding apparatus described. Mixing chamber and valve flushing may be automatically effected during each molding cycle or may be partly or completely eliminated if two or more molds are alternately fed molding material so that the resins and catalysts are in constant flow through the mixing chambers.

In FIG. 5 cell forming resin and catalyst from pumps 79D and 79E are flowed to a mixing chamber 94 containing mixing blades or other means which are driven by a motor 94M which may be operated at constant or variable speed as described by signals passed thereto from the master controller 71. The output of chamber 94 is fed through a rotary coupling 106 to tube 101 and then to tubular insert 101 from which it is ejected into the interior of the hollow molding formed of the instant set polymer (ISP) resin. If the fast setting or ISP resin has set or sets to a state of self support when the expanding resin is injected from mixing chamber 94, then the composite molding may be removed from the mold cavity before the resin from chamber 94 has completely set or perhaps even completely expanded provided that its expansion will not detrimentally deform the shell.

It is also noted that a plurality of solenoid operated valves such as 102 and 103 may be variably controlled in their operation to conteol resin flow into the mold in accordance with the mold movement and resin mixing functions. The single tube 101 may also be replaced by a plurality of tubes or passageways for the different resins extending parallel to each other or across different portions of the mold cavity with each containing one or more inlets to the mold cavity which are in the shapes of orifices or are defined by respective solenoid or motor operated valve inlets or spray nozzles. The tube 101 or plural tubes may remain in the molding after is removed from the mold or may be removed therefrom and the openings formed thereby filled with resin or plugged.

In a modified form of the invention, a control system and a plurality of mixing chambers of the types provided in FIGS. 5 and 6 may be employed to produce hollow objects per se of one or a plurality of different resins by rotational molding or may be employed to produce solid objects without moving the mold bythe controlled flow of the same or different molding materials through different inlets to a mold. Also, solid or hollow articles may be molded of a plurality of layers of the same or different fast setting resins by intermittently introducing one predetermined quantity of resin mixture after another into a mold cavity to form different portions of the same molding as different stratum or sections thereof, one molded against the other.

I claim:

1. A method of molding large articles of manufacture comprising:

supporting a closed cavity rotational casting mold for simultaneous movement about a plurality of axes, providing a plurality of streams of fluent molding material from respective reservoirs thereof located at fixed locations next to said mold, power driving said closed mold to cause it to execute controlled simultaneous movement about said plurality of axes, simultaneously flowing said plurality of streams of fluent molding material to respective different portions of the cavity of said mold while the mold is in multi-axis motion so as to distribute respective materials from said separate streams about different portions of said mold and to cause such materials to unite and to predeterminately occupy said mold cavity as an integral body of molding material, solidifying the materials disposed in said different portions of said mold cavity to form a unitary article of the material flowed to said different portions of the cavity of said mold while the mold is in multi-axis movement.

2. A method in accordance with claim 1 wherein at least one of said plurality of streams of molding material contains a fast setting resin and wherein the flows of said separate streams of molding material and the movement of said mold are such as to cause said fast setting resin to occupy a predetermined portion of the mold cavity before the fast setting resin solidifies in said mold.

3. A method in accordance with claim 2 wherein the simultaneous flow of said plurality of molding materials to said mold cavity is program controlled to provide predetermined quantities of said molding material in said mold through respective inlets to said mold cavity such that the mold cavity is predeterminately occupied by said fast setting resin before said fast setting resin solidifies in said mold.

4. A method in accordance with claim 1 wherein said plurality of streams of molding material each contain a fast setting resin and the simultaneous flow of said streams of fast setting resin is program controlled by a master controller to predetermine the quantities of said fast setting resin introduced into each of said different portions of said mold.

5. A method in accordance with claim 4 wherein said plurality of streams of molding material each contain the same fast setting resin which solidifies as a unitary article in said mold cavity.

6. A method in accordance with claim 5 wherein said plurality of streams each contains a fast setting resin which is different from the fast setting resin contained in the other streams.

7. A method in accordance with claim 4 wherein each of said plurality of streams of fast setting resin introduced into the mold cavity is flowed from a separate reservoir and is mixed with a catalyst as it flows from its reservoir and said master controller is operable to control resin and catalyst flow from each of said reservoirs and to also control the mixing of said catalysts and resins after each of the resins leave their respective reservoirs.

8. A method in accordance with claim 7 wherein each of said plurality of streams of fast setting resin is flowed through a different conduit.

9. A method in accordance with claim 8 wherein said conduits through which said fast setting resins are flowed to said mold cavity are flexible lines which flex during the multiple axis movement of said mold.

10. A method of molding comprising:

simultaneously generating first and second streams of different molding materials, controlling the flow of said molding materials through separate passageways to respective inlets to the cavity of a mold to cause each molding material to occupy a different portion of the mold cavity and when predetermined quantities of each molding material have been delivered to respective portions of the mold through its inlet, terminating the flow of molding material through its passageway and causing the molding materials in the mold to solidify and to form a unitary article composed of respective portions formed of said different molding materials flows in said first and second streams.

11. A method in accordance with claim 10 wherein said mold is caused to move in a manner to distribute said molding materials against the wall of the mold and the termination of flow of said molding materials is effected before the mold is filled with molding material so as to form a hollow article the wall of which hollow article is composed of said different molding materials.

12. A method in accordance with claim 10 wherein one of the molding materials introduced into said mold is terminated in its flow to the mold cavity before the other.

13. A method in accordance with claim 10 wherein each of said molding materials is caused to substantially occupy a respective portion of the mold cavity into which it is introduced.

14. A method in accordance with claim 10 wherein said first and second molding materials are fast setting resins further including controlling the flow and mixing of respective catalysts with said fast setting resins prior to introducing the molding materials to the cavity of said mold.

* * * * *